(12) United States Patent
Pearson et al.

(10) Patent No.: US 7,797,548 B2
(45) Date of Patent: Sep. 14, 2010

(54) METHOD AND SYSTEM FOR MAINTAINING LOGIN PREFERENCE INFORMATION OF USERS IN A NETWORK-BASED TRANSACTION FACILITY

(75) Inventors: Jennifer Pearson, San Jose, CA (US); Alex D. Poon, Los Altos Hills, CA (US); Buffy Poon, Los Altos Hills, CA (US)

(73) Assignee: eBay Inc., San Jose, CA (US)

( * ) Notice: Subject to any disclaimer, the term of this patent is extended or adjusted under 35 U.S.C. 154(b) by 277 days.

(21) Appl. No.: 11/941,686

(22) Filed: Nov. 16, 2007

(65) Prior Publication Data

US 2008/0072062 A1 Mar. 20, 2008

Related U.S. Application Data

(63) Continuation of application No. 09/772,347, filed on Jan. 29, 2001, now Pat. No. 7,310,733.

(51) Int. Cl.
G06F 21/00 (2006.01)
(52) U.S. Cl. ............................................ 713/185; 726/8
(58) Field of Classification Search ........................ None
See application file for complete search history.

(56) References Cited

U.S. PATENT DOCUMENTS

| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |

(Continued)

FOREIGN PATENT DOCUMENTS

CA 2253543AA 10/1997

(Continued)

OTHER PUBLICATIONS

My Yahoo pulled from Wayback machine, Dec. 12, 1998 [retrieved on Oct. 14, 2004] from http://web.archive.org/web/19981212015816/http://my.yahoo.com/.*

(Continued)

*Primary Examiner*—Brandon S Hoffman
(74) *Attorney, Agent, or Firm*—Schwegman, Lundberg & Woessner, P.A.

(57) ABSTRACT

The present invention relates to various aspects for maintaining and utilizing login preference information of users of a network-based transaction facility. In one embodiment, user interface information is communicated to a client via a communications network. The user interface information includes information concerning a plurality of features within the network-based transaction facility. The user interface information also specifies a login interface that facilitates user input of login preference information pertaining to each of the plurality of features. Further, the login preference information is received from the client via the communications network and utilized to control user access to any of the plurality of features within the network-based transaction facility via the communications network.

19 Claims, 16 Drawing Sheets

U.S. PATENT DOCUMENTS

| | | |
|---|---|---|
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,884,056 A | 3/1999 | Steele |
| 5,890,138 A | 3/1999 | Godin et al. |
| 5,905,974 A | 5/1999 | Fraser et al. |
| 5,905,975 A | 5/1999 | Ausubel |
| 5,922,074 A | 7/1999 | Richard et al. |
| 5,926,794 A | 7/1999 | Fethe |
| 5,983,227 A * | 11/1999 | Nazem et al. ................ 707/10 |
| 5,991,739 A | 11/1999 | Cupps et al. |
| 6,035,288 A | 3/2000 | Solomon |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,266,651 B1 | 7/2001 | Woolston |

FOREIGN PATENT DOCUMENTS

| | | |
|---|---|---|
| FR | 2658635 A1 | 8/1991 |
| NL | 9300266 A | 2/1993 |
| WO | WO-9215174 A1 | 9/1992 |
| WO | WO-9634356 A1 | 10/1996 |
| WO | WO-9737315 A1 | 10/1997 |
| WO | WO-9963461 A1 | 12/1999 |
| WO | WO-0112398 A1 | 2/2001 |

OTHER PUBLICATIONS

"Anonymous Delivery of Goods in Electronic Commerce", *IBM Technical Disclosure Bulletin*, vol. 39(3), (Mar. 1996),363-366.

"Haggle Online Account Information and Maintenance", http://web.archive.org/web/19980629023443/www.haqq1e.com/account.html, Pulled from Wayback Machine—www.archive.org,(Jun. 29,1998).

"Mediappraise: Mediappraise Receives National Award for Web-Based Technology That Enables Companies to Solve Thorny HR Problems", www.businesswire.com, Business Editors,(Dec. 14, 1998),2 pgs.

"My Yahoo Web Page", http://web.archive.org/web/19981212015816/h550:://my.yahoo.com, "MyYahoo" page obtained from "Wayback Machine" on Oct. 14, 2004,(Dec. 12, 1998),3 p.

"Onsale Joins Fray as Online Shopping Picks Up Speed: Internet Booms", *Computer Reseller News*, CMP Publications, Inc., USA,(Jun. 5, 1995),73.

"Onsale: Onsale Brings Thrill of Auctions and Bargain Hunting Online; Unique Internet retail service debuts with week-long charity auction for the Computer Museum in Boston", (May 24, 1995),3 pgs.

"Personal Optimized Decision/Transaction Program", *IBM Technical Disclosure Bulletin*; vol. 38(1), USA, (Jan. 1995),83-84.

"Yahoo Auctions", http://web.archive.org/web/19990208003424/http://auctions.yahoo.com/, (Feb. 8, 1999),2 p.

Clemins, E , et al., "Evaluating the Prospects for Alternative Electronic Securities Markets", *International Conference on Information Systems*; vol. 12, (1991),53-61.

Hess, C M., et al., "Computerized Loan Organization System: An Industry Case Study of the Electronic Markets Hypothesis", *MIS Quarterly*, vol. 18(3), (Sep. 1994),251-274.

Lee, H. G., "Electronic brokerage and electronic auction: the impact of IT on market structures", *Proceedings of the Twenty-Ninth Hawaii International Conference on System Sciences*, vol. 4 (1996),397-406.

Malone, T W., et al., "Electronic Markets and Electronic Hierarchies", *Communications of the ACM*; vol. 30 (6), USA, (Jun. 1987),484-497.

Mardesich, J , "Onsale Takes Auction gavel electronic", *Computer Reseller News*, Mountain View, California,(Jul. 8, 1996),p. 2 continued on p. 32.

Massimb, MN , et al., "Electronic Trading, Market Structure and Liquidity", *Financial Analysts Journal*, vol. 50(1), Charlottesville, Virginia,(Jan.-Feb. 1994),39-50.

Meade, J. , "Visual 360: A Performance Appraisal System That's 'Fun'", *HR Magazine*, Society for Human Resource Management. ,(Jul. 1999),44, 7, 2 pgs.

Neo, B S., "The implementation of an electronic market for pig trading in Singapore", *Journal of Strategic Information Systems*; vol. 1(5), (Dec. 1992),278-288.

Post, D L., et al., "Application of Auctions as a Pricing Mechanism for the Interchange of Electric Power", *IEEE Transactions on Power Systems*; vol. 10(3), (Aug. 1995),7 pgs.

Preist, C , et al., "Adaptive Agents in a Presistent Shout Double Auction", *Proceedings, 1st International Conf. on information and Computation Economies*, Oct.-25-28, 1998, Charleston, N.C.,(Oct. 25, 1998),11-18.

Reck, Martin , "Formally Specifying and Automated Trade Execution System", *Journal of Systems and Software*; vol. 21, Elsevier Science Publishing Co., Inc. New York, NY,(Jun. 1993),245-252.

Resnick, P , et al., "Reputation Systems", *Assoc. for Computing Machinery Communications of the ACM*, vol. 43 (12), (Dec. 2000),4 pgs.

Rockoff, T E., et al., "Design of an Internet-based system for remote Dutch auctions", *Internet Research: Electronic Networking Applications and Policy*, vol. 5(4), (Jan. 1, 1995),10-16.

Schmid, B F., "The Development of Electronic Commerce", *Newsletter of the Competence Centre Electronic Markets*, No. 9/10, (Oct. 1993).

Siegmann, Ken , "Nowhere to go but up", *PC Week*; vol. 12(42), Ziff-Davis Publishing Company,(Oct. 23, 1995),1-3.

Warbelow, A , et al., "Aucnet: TV Auction Network System", *Harvard Business School Case/Study*, HBVR#9-190-001, USA,(Jul. 1989),1-15.

Zwass, Vladimir , "Electronic Commerce: Structures and Issues", *International Journal of Electronic Commerce*, vol. 1(1), (Fall 1996),3-23.

* cited by examiner home | my page | site map | sign in

Browse | Sell | Services | Search | Help | Community

[ Search ] tips
☐ Search titles and descriptions

702

Bid confirmed for: test item, do not bid (item #109574)

Your bid was in the amount of:            US$0.01
Your maximum bid was in the amount of:    US$0.01
After processing all the open bids for
this item, the current bid price is       US$0.01

Thank you for your bid! You are the current high bidder for this item! You will be notified if your maximum bid is exceeded by another bidder.

Please note that the listings on the index pages are not updated right away, but your bid has been recorded.

Important: please take not of the closing date of this auction. At midnight following the close, the seller and the high-bidder will be notified by e-mail, and you have only three business days to contact each other befor losing your position as high-bidder.

802

Note: Are you tired of typing in your User ID and Password over and over again? Try the new [ Sign In ] feature to save time.

test item, do not bid (109574)

Books, Movies, Music:Movies:Videos:General

| | | | | |
|---|---|---|---|---|
| Description | Currently | US$0.01 | First bid | US$0.01 |
| | Quantity | 1 | # of bids | 1 (bid history) (with emails) |
| | Time left | 6 days, 23 hours + | Location | San Jose |
| | Started | 08/03/99, 17:46:54PDT | ✉ (mail this auction to a friend) |
| | Ends | 08/10/99, 17:46:54PDT | 🎁 (request a gift alert) |
| Bid! | Seller | mark2 (25) |
| | | (view comments in seller's Feedback Profile) (view seller's other auctions) |
| | | (ask seller a question) |
| | High bid | jen (0) |
| | Payment | See item description for payment methods accepted |
| | Shipping | See item description for shipping charges |

Seller assu8mes all responsibility for listing this item. You should contact the seller to resolve any questions before bidding. Currency is U.S. dollar (US$) unless otherwise noted.

FIG. 7 home | my page | site map | sign in

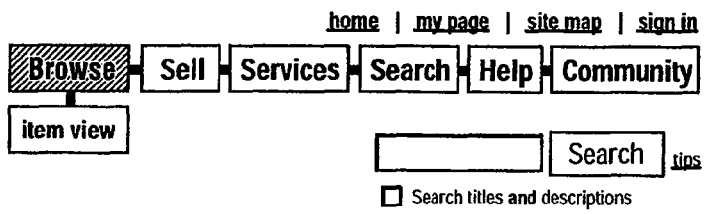

704

User ID History and Email Address Request Form

We kindly request that you submit your User ID and password to view the User ID History or email addresses of other users.

Note: When the shades icon appears next to a User ID, it signifies that the user has changed his/her User ID within the last 30 days. The shades icon will disappear after the user has maintained the same User ID for a 30-day period.

Submit

902

Note: Are you tired of typing in your User ID and Password over and over again? Try the [Sign In] feature to. save time

FIG. 8

708 home | my page | site map | sign in

| Browse | Sell | Services | Search | Help | Community |

| overview | registration | buying & selling | my page | about me | feedback forum | safe harbor |

[    Search    ] tips

☐ Search titles and descriptions

Welcome, please sign in

Existing users, sign in to save time for bidding, selling, and other activities:

| User Member Sign In |
|---|
| User ID: [           ] — 1002 |
| Password: [           ] — 1004 |

Note: By sign in, you'll get a temporary "cookie" which will (1) remember your User ID for this browser session, (2) allow you to setup where you would also like your Password to be remembered for this browser session. If there is no activities in the next 20 minutes or when you close the browser, the cookie will expire. For more information about cookies, click here.

1006

[Sign In]

New User?

~716 home | my page | site map | sign in

Browse | Sell | Services | Search | Help | Community

| overview | registration | buying & selling | my page | about me | feedback forum | safe harbor |

[Search] tips
☐ Search titles and descriptions

My page. Welcome Jennifer Pearson

| Recent Feedback | Items I'm Bidding On | Items I'm Selling | My Account | Favorite Categories | Auction Tracking | Prefences |

Set Sign In Preferences
You are currently signed in, check the boxes below to set up where you would like to have your password remembered during this browser session: (need more explanation)

1402 — ☐ Selling            1408 — ☐ Bidding
1404 — ☐ Chat               1410 — ☐ Feedback
1406 — ☐ My Page            1412 — ☐ Other Activities (such, for example, revise your item, request user email address)

Set Display Preferences
☐ Display bidders/sellers email address information with their User ID

[Save]

FIG. 13

Bid confirmed for: test item, do not bid (item #109574)

Your bid was in the amount of:                 US$0.01
Your maximum bid was in the amount of:     US$0.01
After processing all the open bids for
this item, the current bid price is                   US$0.01

Thank you for your bid! You are the current high bidder for this item! You will be notified if your maximum bid is exceeded by another bidder:

Please note that the listings on the index pages are not updated right away, but your bid has been recorded.

Important: please take not of the closing date of this auction. At midnight following the close, the seller and the high-bidder will be notified by e-mail, and you have only three business days to contact each other befor losing your position as high-bidder.

Note: You are currently signed in for this browser session. To change your sign in preferences, click here. Do not leave your computer un-attended without signing out.

— 1502

--- test item, do not bid (109574)

Books, Movies, Music:Movies:Videos:General

| | | | | |
|---|---|---|---|---|
| Currently | US$0.01 | First bid | US$0.01 |
| Quantity | 1 | # of bids | 1(bid history) (with emails) |
| Time left | 6 days, 23 hours + | Location | San Jose |
| Started | 08/03/99, 17:46:54PDT | ✉ (mail this auction to a friend) |
| Ends | 08/10/99, 17:46:54PDT | 🎁 (request a gift alert) |

Seller      mark2 (25)
             (view comments in seller's Feedback Profile) (view seller's other auctions)
             (ask seller a question)

High bid     jen(0)

Payment    See item description for payment methods accepted
Shipping     See item description for shipping charges Seller assu8mes all responsibility for listing this item. You should contact the seller to resolve any questions before bidding. Currency is U.S. dollar (US$) unless otherwise noted.

FIG. 14

METHOD AND SYSTEM FOR MAINTAINING LOGIN PREFERENCE INFORMATION OF USERS IN A NETWORK-BASED TRANSACTION FACILITY

PRIORITY APPLICATION

This application is a continuation application of U.S. Utility application Ser. No. 09/772,347, filed on Jan. 29, 2001, which application is incorporated herein by reference. Application Ser. No. 09/772,347 has since issued on Dec. 18, 2007 as U.S. Pat. No. 7,310,733.

FIELD OF THE INVENTION

The present invention relates generally to the field of access restriction and, more specifically, to the maintaining login preference information of users in a network-based transaction facility such as, for example, an Internet-based auction facility.

BACKGROUND OF THE INVENTION

A network-based transaction facility (e.g., a business-to-business, business-to-consumer and consumer-to-consumer Internet marketplace and retailer) may offer its users a variety of features. For instance, an Internet-based auction facility may provide such features as bidding, listing, feedback, chatting, etc. Typically, users of a network-based transaction facility must enter their user identifier (user id) and password every time they perform any significant activity within the transaction facility. For example, in an auction facility, a user is required to enter his or her user id and password each time the user wishes to access a bidding feature, a listing feature, a feedback feature, or any other feature provided by the auction facility. Requiring a user to enter his or her user id and password multiple times during the user session within a transaction facility causes inconvenience to the user and destructs the user's attention from the online activity being performed.

SUMMARY OF THE INVENTION

The present invention relates to various aspects for maintaining and utilizing login preference information of users of a network-based transaction facility. In one embodiment, user interface information is communicated to a client via a communications network. The user interface information includes information concerning a plurality of features within the network-based transaction facility. The user interface also specifies a login interface that facilitates user input of login preference information pertaining to each of the plurality of features. Further, the login preference information is received from the client via the communications network and utilized to control user access to any of the plurality of features within the network-based transaction facility via the communications network.

BRIEF DESCRIPTION OF THE DRAWINGS

The present invention is illustrated by way of example and not limitation in the figures of the accompanying drawings, in which like references indicate similar elements and in which:

FIGS. 7-15 are exemplary representations of various interfaces included in the sequence of interfaces shown in FIG. 6.

DETAILED DESCRIPTION

A method and system for maintaining and utilizing login preference information of users of a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like.

Transaction Facility

Figure 1:
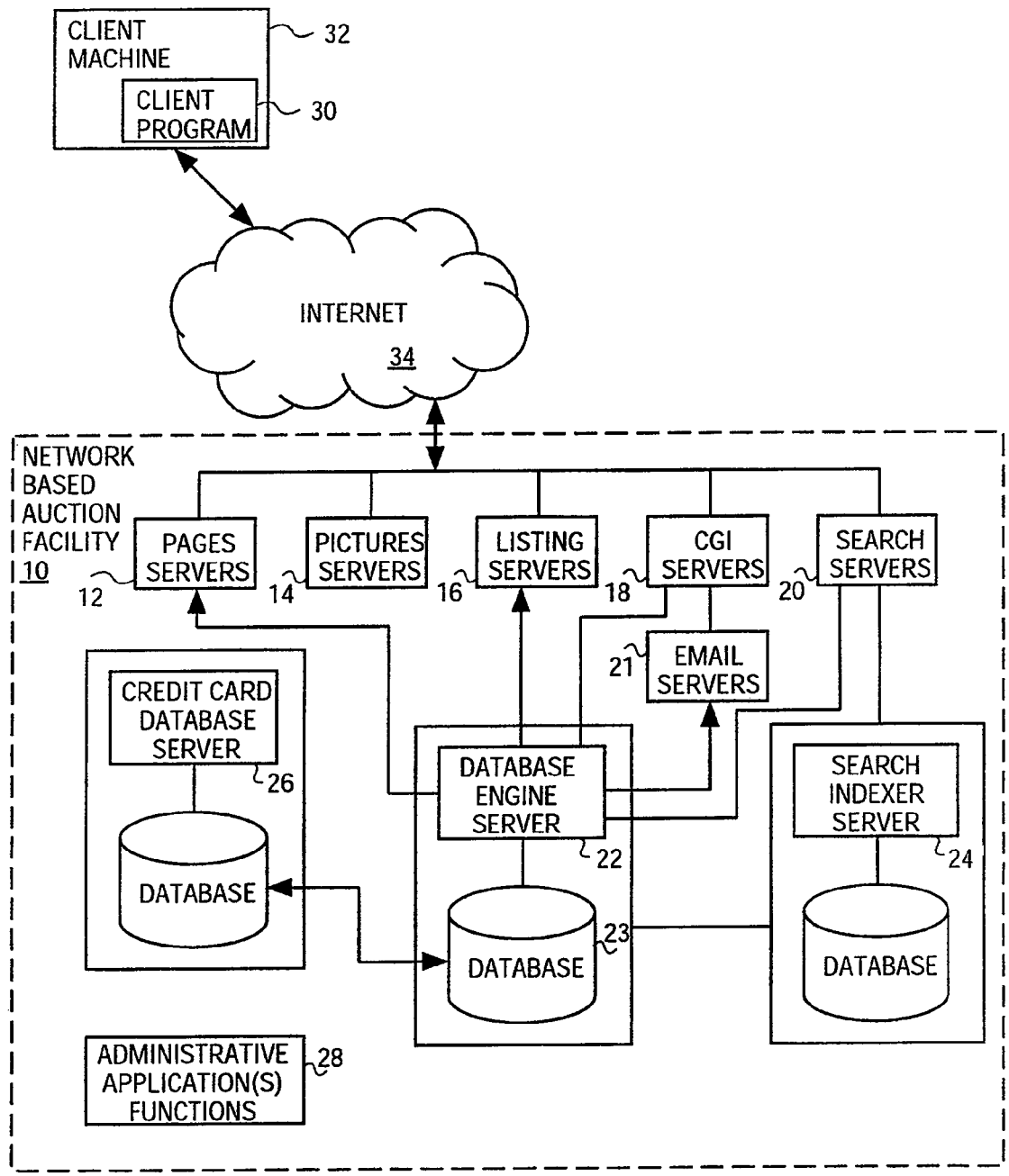
FIG. 1 is a block diagram of one embodiment of a network-based transaction facility.

FIG. 1 is block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
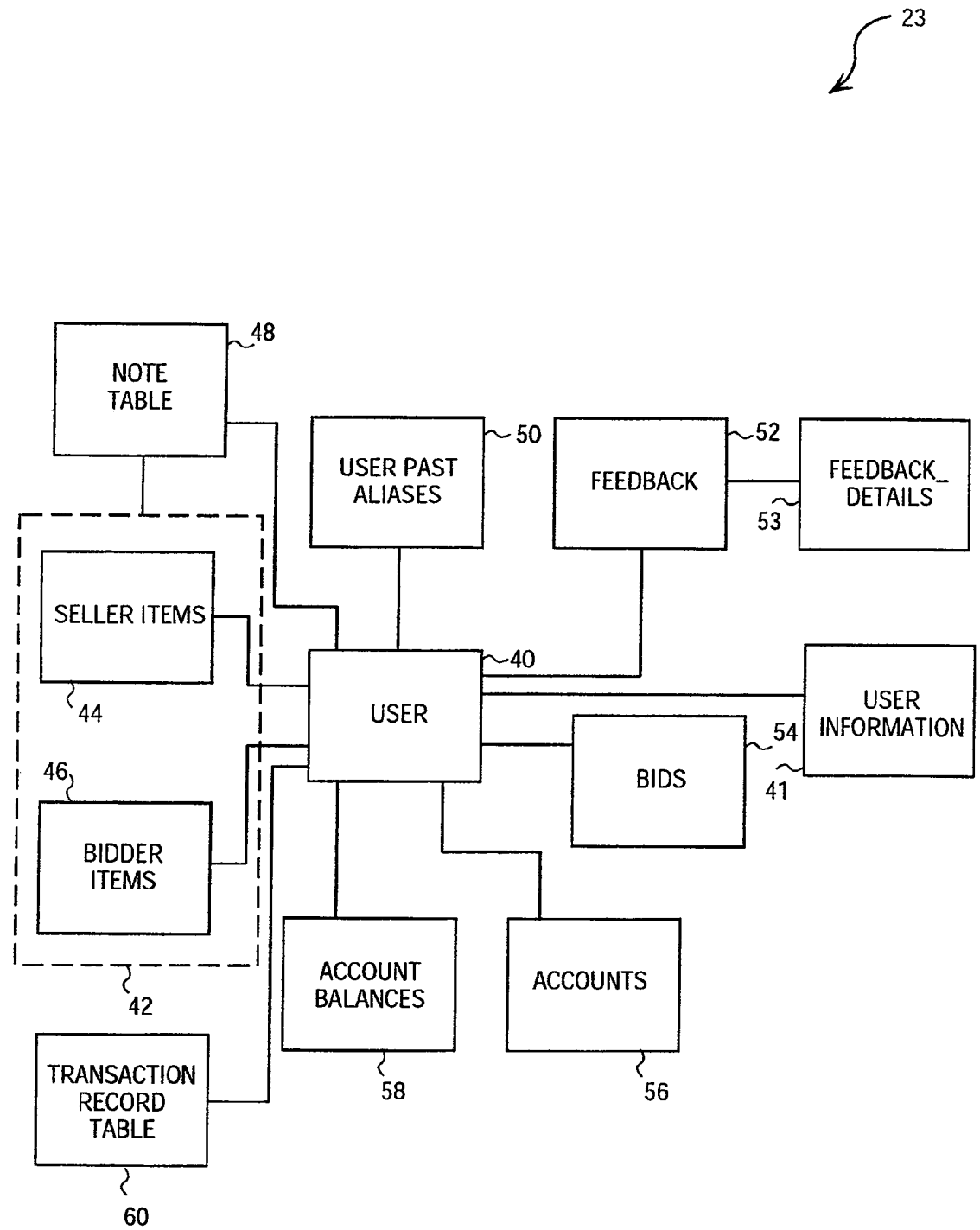
FIG. 2 is a block diagram of one embodiment of a database maintained by a database engine server.

FIG. 2 is a database diagram illustrating an exemplary database 23, maintain by and accessed via the database engine server 22, which at least partially implements and supports the auction facility 10. The database 23 may, in one embodiment, be implemented as a relational database, and includes a number of tables having entries, or records, that are linked by indices and keys. In an alternative embodiment, the database 23 may be implemented as collection of objects in an object-oriented database.

Central to the database 23 is a user table 40, which contains a record for each user of the auction facility 10. A user may operate as a seller, buyer, or both, within the auction facility 10. A user information table 41 is linked to the user table 40 and includes more detailed information about each user. The database 23 also includes item tables 42 that may be linked to the user table 40. Specifically, the tables 42 include a seller items table 44 and a bidder items table 46. A user record in the user table 40 may be linked to multiple items that are being, or have been, auctioned via the facility 10. A link indicates whether the user is a seller or a bidder (or buyer) with respect to items for which records exist within the item tables 42. The database 23 also includes a note table 48 populated with note records that may be linked to one or more item records within the item tables 42 and/or to one or more user records within the user table 40. Each note record within the table 48 may include, inter alia, a comment, description, history or other information pertaining to an item being auction via the auction facility 10, or to a user of the auction facility 10.

A number of other tables are also shown to be linked to the user table 40, namely a user past aliases table 50, a feedback table 52, a feedback details table 53, a bids table 54, an accounts table 56, an account balances table 58 and a transaction record table 60.

Figure 3:
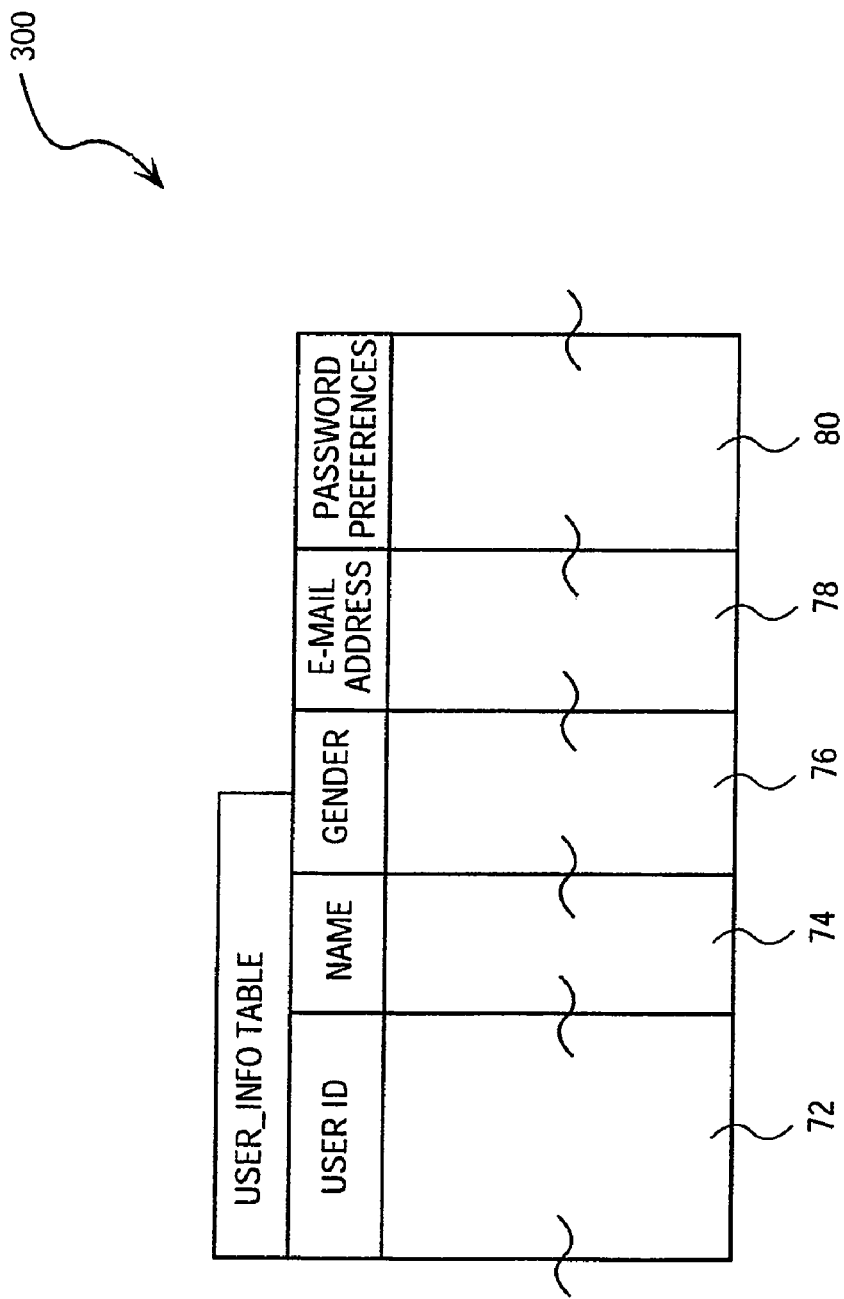
FIG. 3 is a diagrammatic representation of one embodiment of a user information table within the database.

FIG. 3 is a diagrammatic representation of an exemplary embodiment of the user information table 41. The user information table 41 stores detailed information about each user participating in the action facility 10. The table 41 includes a user identifier column 72 that stores, for each entry, a user identifier providing a pointer to the user table 40. A name column 74 stores the full name of each user. A gender column 76 stores the gender of each user. An e-mail address column 78 stores each user's e-mail address. A password preferences column 80 stores user login preference information that pertains to a plurality of features offered by a network-based transaction facility (e.g., auction facility 10).

It will be appreciated that other descriptive information may also populate the user information table 41.

Maintaining Login Preference Information

In order to facilitate the convenience and efficiency of users conducting business transactions within a network-based transaction facility such as auction facility 10, the present invention proposes a method and system whereby a user may provide his or her login preference information pertaining to any of a plurality of features offered by the network-based transaction facility. This login preference information is stored in a database (e.g., database 23) and utilized when a determination is made as to whether to require the user to enter his or her user identifier (user id) and password for accessing a feature within the network-based transaction facility.

Figure 4:
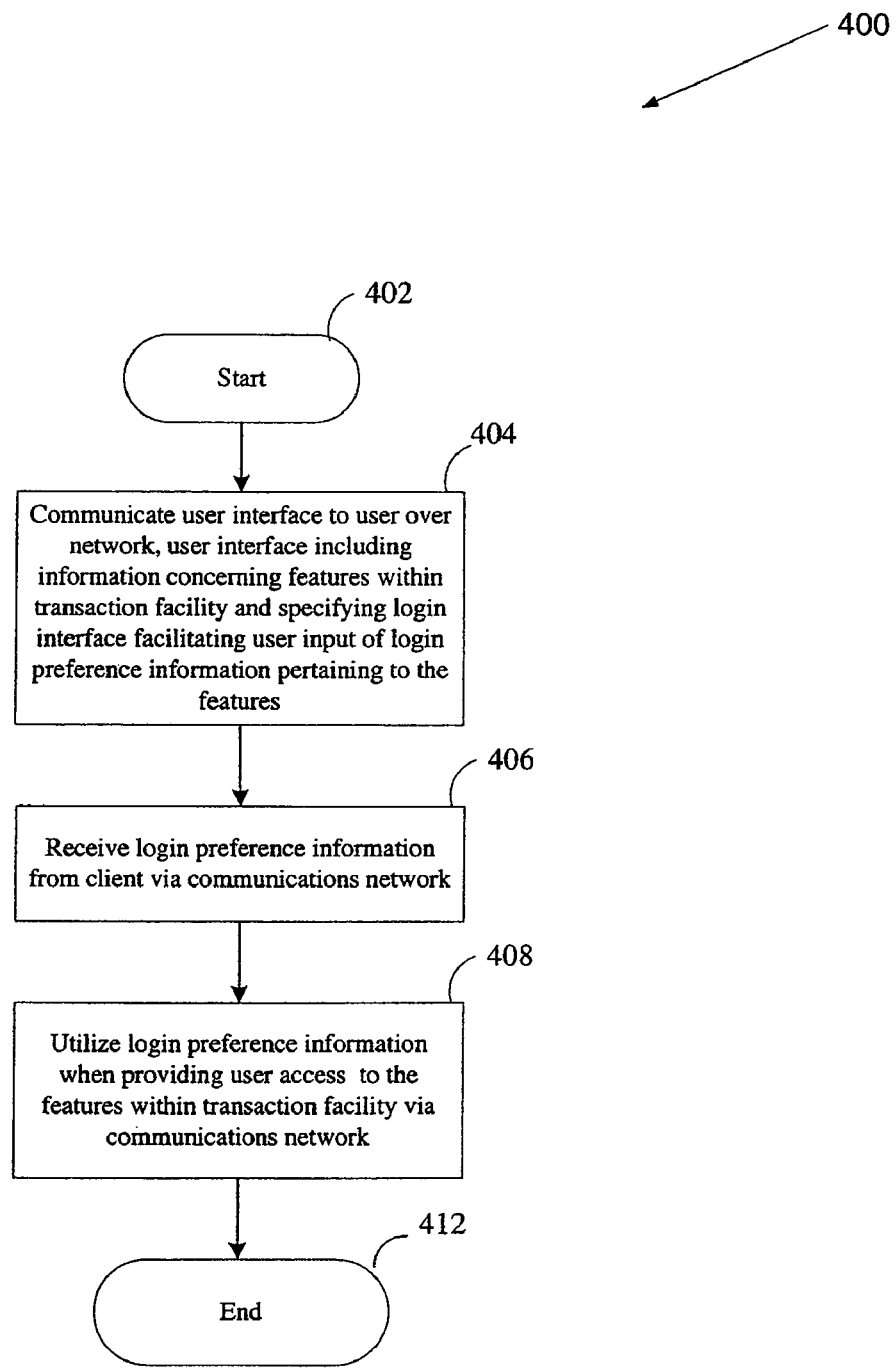
FIG. 4 is a flow chart of one embodiment of a method for maintaining login preference information of users of a network-based transaction facility.

FIG. 4 is a flow chart of one embodiment of method 400 for maintaining login preference information of users of a network-based transaction facility. Method 400 begins with communicating user interface information to a client via a communications network (processing block 404). The user interface information includes information concerning a plurality of features within the network-based transaction facility. For instance, the plurality of features within network-based auction facility 10 may include such features as bidding, listing, feedback, chatting, etc. The user interface information also specifies a login interface that facilitates user input of login preference information pertaining to the features offered by the network-based transaction facility. In one embodiment, the login preference information indicates whether a user password should be remembered for each of these features. In one embodiment, these features do not include the features that involve display of user personal information. For instance, the user will be always required to enter a password for any feature that may display the credit card information or registration information of the user.

At processing block 406, the login preference information is received from the client via the communications network (e.g., via Internet). In one embodiment, the login preference information is stored in a database (e.g., in table 41 of database 23). Further, at processing block 410, the login preference information is utilized when providing user access to one of the features offered by the network-based transaction facility. One embodiment for utilizing the login preference information is described in greater detail below in conjunction with FIG. 5.

In one embodiment, the user is presented with an interface that allows the user to change the login preference information. In this embodiment, the database is updated each time the user changes the login preference information.

In one embodiment, when the user logs on into the transaction facility, a determination is made as to whether the user has previously provided the login preference information. If the determination is positive, a welcome user interface is presented to the user. The welcome user interface includes information indicating that the user has previously provided the login preference information and contains a link to a login preference interface, which allows the user to modify the existing login preference information.

Figure 5:
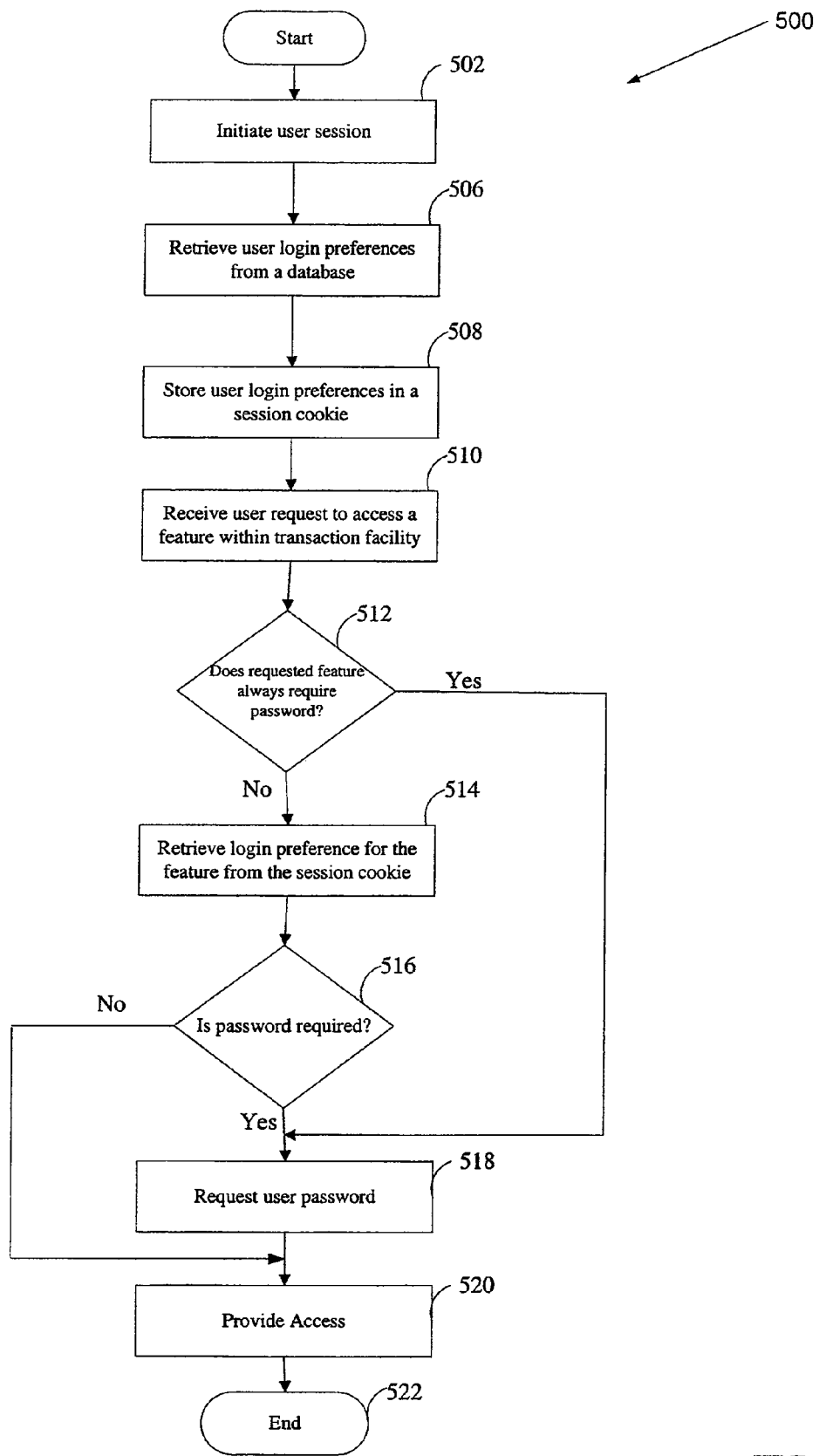
FIG. 5 is a flow chart of one embodiment of a method for utilizing user login preference information within a network-based transaction facility.

FIG. 5 is a flow chart of one embodiment of a method 500 for utilizing user login preference information within a network-based transaction facility.

Method 500 begins with initiating a user session (processing block 504). The user session is typically initiated when the user logs into the network-based transaction facility by providing his or her logon information (e.g., user id and password). Next, user login preference information is retrieved from a database (processing block 506) and stored in a session cookie (processing block 508). The session cookie may also store other information such as, for example, client's IP address, cookie ID, user ID, etc. In one embodiment, the information stored in the session cookie is encrypted. In one embodiment, the session cookie expires in a predefined time period (e.g., 20 minutes) if the user conducts no activity within the network-based transaction facility or if the user logs out (e.g., via the regular logout procedure or by closing the browser).

Subsequently, during the session, the user submits a request to access a particular feature within the network-based transaction facility (e.g., by activating a link or a button). Upon receiving the user request (processing block 510), a determination is made as to whether the requested feature always requires a password (decision box 512). In one embodiment, the password is always required for a feature involving display of user personal information such as, for example, the credit card information or registration information of the user. If the requested feature always requires a password, the user password is requested (processing block 514) and, upon receiving the correct password, access to the requested feature is provided (processing block 520).

Otherwise, if the requested feature is not designated as always requiring a password, login preference information pertaining to the requested feature is retrieved from the session cookie (processing block 514). Next, a determination is made as to whether the user has selected to require a password for this feature using the login preference information (processing block 516). If a password is required, the user is requested to enter a password (processing block 518), and if the entered password is correct, the access to the feature is provided (processing block 520). If the login preference information indicates that the password is not required, method 500 flows directly to processing block 520, which provides user access to the requested feature.

User Interfaces

Figure 6:
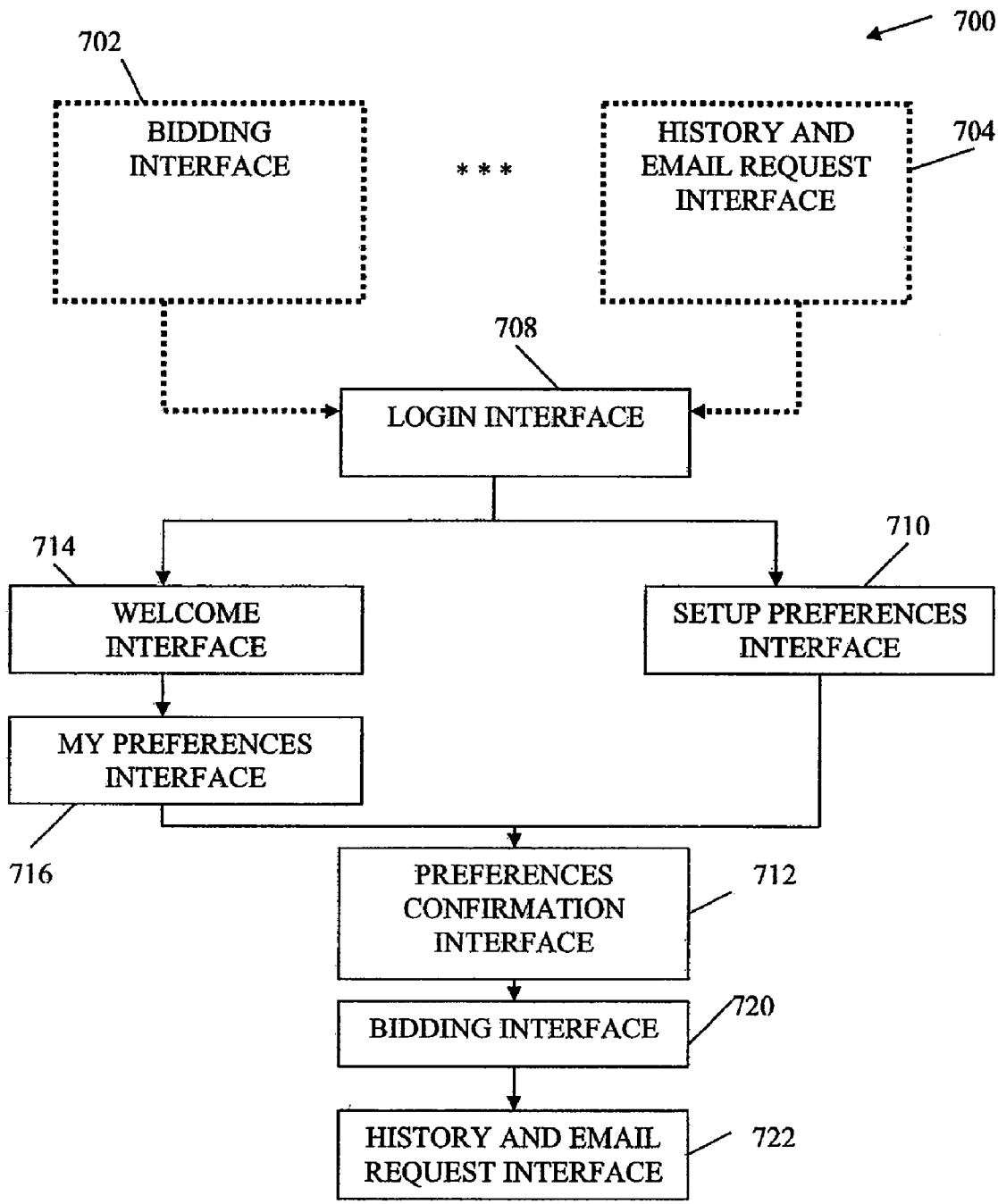
FIG. 6 is a block diagram of one embodiment of an interface sequence implemented to maintain and utilize login preference information of users of a network-based transaction facility.

FIG. 6 shows an interface sequence 700, according to an exemplary embodiment of the present invention, that may be implemented by auction facility 10 to maintain and utilize login preference information of users. Exemplary representations of the various interfaces included within sequence 700 are shown in FIGS. 7-15.

Interface sequence 700 commences with a login interface 708 through which a user of auction facility 10 provides at least a user identifier and associated password. Login interface 708 may be accessed via a number of interfaces communicating information pertaining to various features offered by auction facility 10 (e.g., bidding interface 702 or history and email request interface 704), each of which comprises a markup language document (e.g., HTML document) including a hypertext link to an object that generates login interface 708 as well as further interfaces of sequence 700. In one embodiment, login interface 708 also allows a user to request not to use a cookie during his or her online activity within auction facility 10.

If the user logs on into auction facility 10 via login interface 708 for the first time, the user is presented with setup preferences interface 710 which specifies various features offered by auction facility 10 and facilitates user input of login preference information pertaining to each of these features. That is, the user may indicate via setup preferences interface 710 whether the user wants to have his or her password remembered for each feature. After the user preferences are set, preferences confirmation interface 712 is displayed to inform the user that the preference settings have been saved and that the user may modify them upon accessing my preferences interface 716.

If the user logs on into auction facility 10 via login interface 708 not for the first time (i.e., the user has previously provided user login preference information), welcome interface 714 is displayed that welcomes the user by name and includes a link to my preferences interface 716. My preferences interface 716 displays existing user login preferences, i.e., identifies the features of auction facility 10 for which the user wishes to have the user password remembered, and allows the user to modify the existing preferences. Preferences confirmation interface 712 confirms that the user settings have been saved.

Further, when the user wishes to access a feature within auction facility 10, the user may or may not be required to enter a password depending on the user login preferences. For instance, if the user selected to have his or her password remembered for a bidding feature, bidding interface 720 is provided without requiring the user to enter the password. If the user chose not to have the password remembered for the bidding feature, the user is requested to enter the password before accessing bidding interface 720. In addition, bidding interface 720 includes a link to my preferences interface 716 to allow the user to modify the login preferences.

If the user wishes to view history or email address of another user, the user may be required to enter the password via history and email request interface 722 or, alternatively, directly receive the requested information depending on the user setting for this feature.

It should be noted that interfaces of other features may be included within sequence 700 instead of, or in addition to, any of bidding interface 720 and history and email request interface 722 depending on what features the user wishes to access during his or her online activity within auction facility 10.

Figure 15:

FIGS. 7-15 are exemplary representations of various interfaces included in sequence 700. FIGS. 7 and 15 are exemplary representations of a bidding interface. Bidding interface 702 of FIG. 7 is displayed to a user who has not previously set his or her login preferences. Bidding interface 702 includes button 802 allowing the user to set the login preferences via login interface 708. Bidding interface 720 of FIG. 14 is displayed to a user who has already set the login preferences in a previous session. Bidding interface 720 provides link 1502 to my preferences interface 716 allowing the user to modify the existing login preferences.

FIGS. 8 and 15 are exemplary representations of a history and email request interface. History and email request interface 704 of FIG. 8 is displayed to a user who has not previously set his or her login preferences and includes button 902 allowing the user to set the login preferences via login interface 708. History and email request interface 722 of FIG. 15 is displayed to a user who has previously selected not to have a user password remembered for this feature and includes link 1606 to my preferences interface 712 allowing the user to modify the existing login preferences.

FIG. 9 is an exemplary representation of login interface 708. Login interface 708 provides user identifier field 1002 and password field 1004 into which the user may enter a user identifier and password. In addition, the user may request not to use a cookie during the user online activity within auction facility 10 using link 1006.

Figure 10:
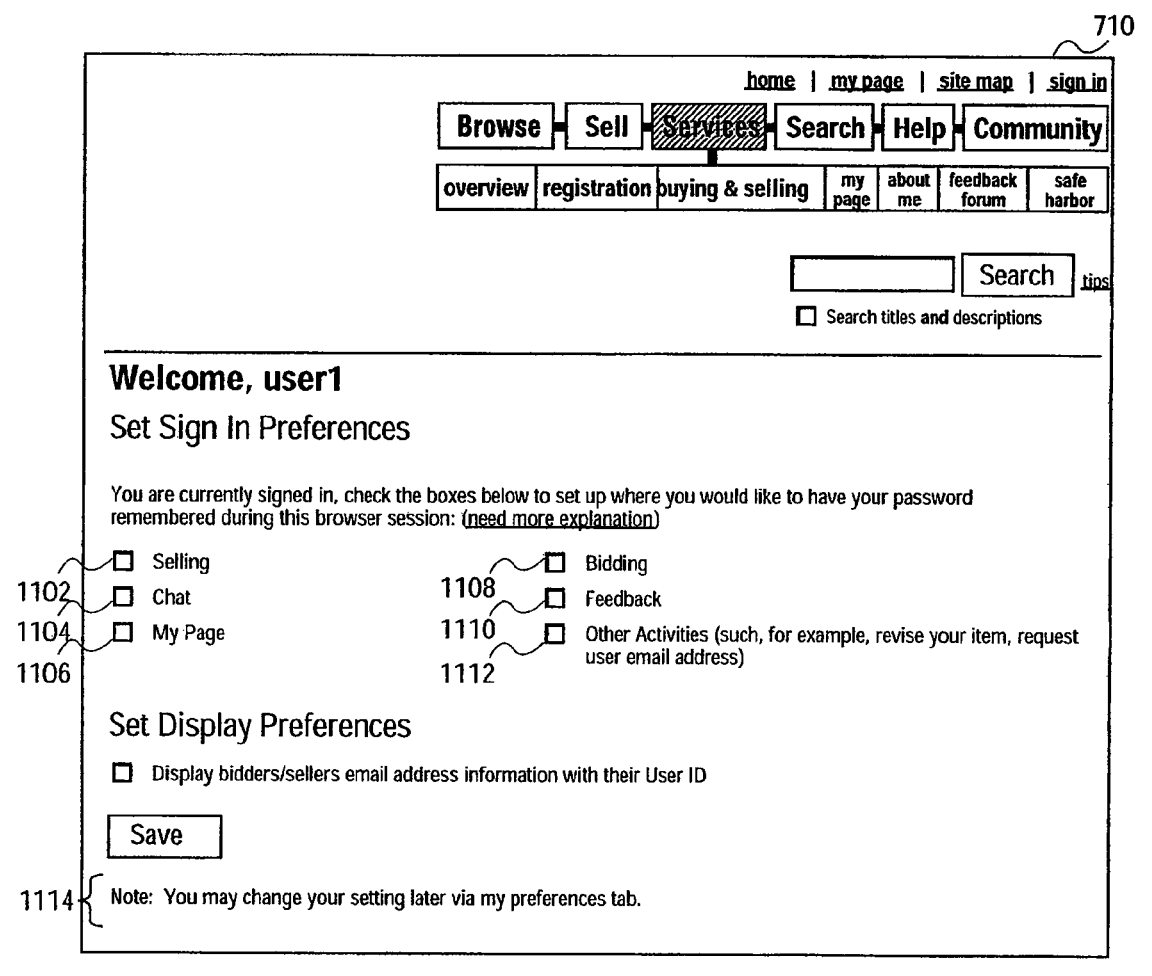

FIG. 10 is an exemplary representation of setup preferences interface 710 which specifies various features offered within auction facility 10, namely selling, chat, my page, bidding, feedback, and other features. Check boxes 1102, 1104, 1106, 1108, 1110 and 1112 allow the user to set his or her preference for each of these features. That is, if the user checks any of these check boxes, the user will not be required to provide a password before accessing a corresponding feature. Note 1114 indicates that the user may change his or her preferences at any time using my preferences interface 716.

Figure 11:
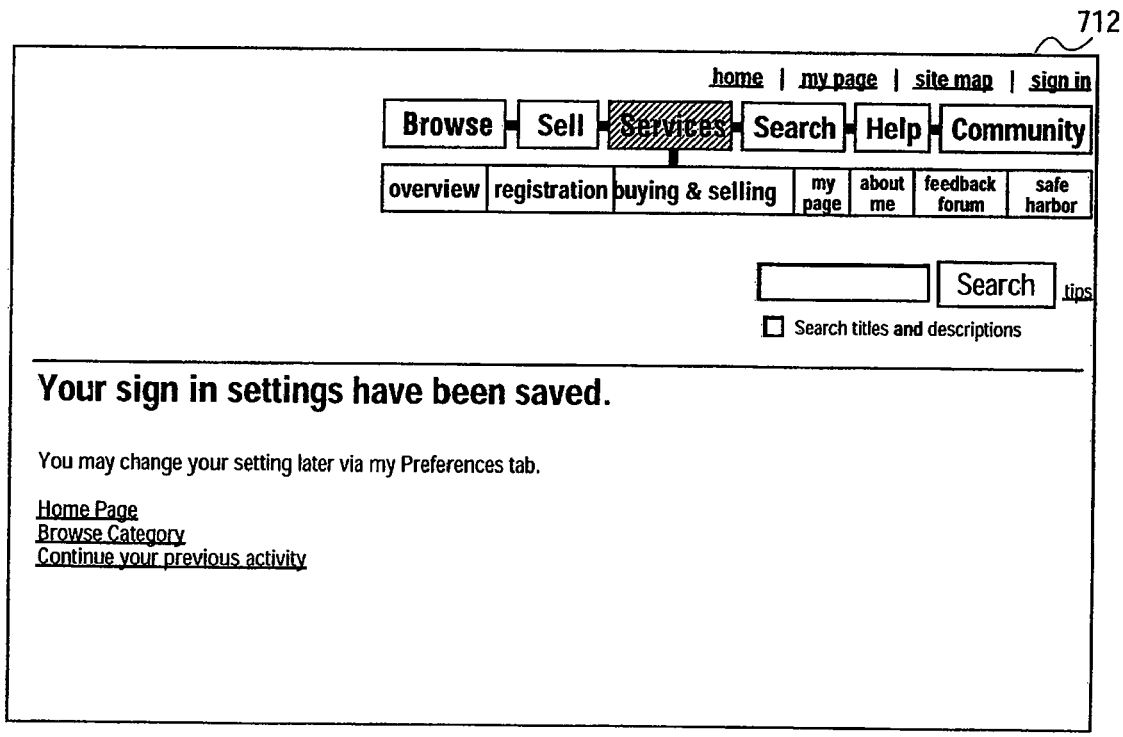

FIG. 11 is an exemplary representation of preferences confirmation interface 712 which notifies the user that the user login preference information has been saved.

Figure 12:
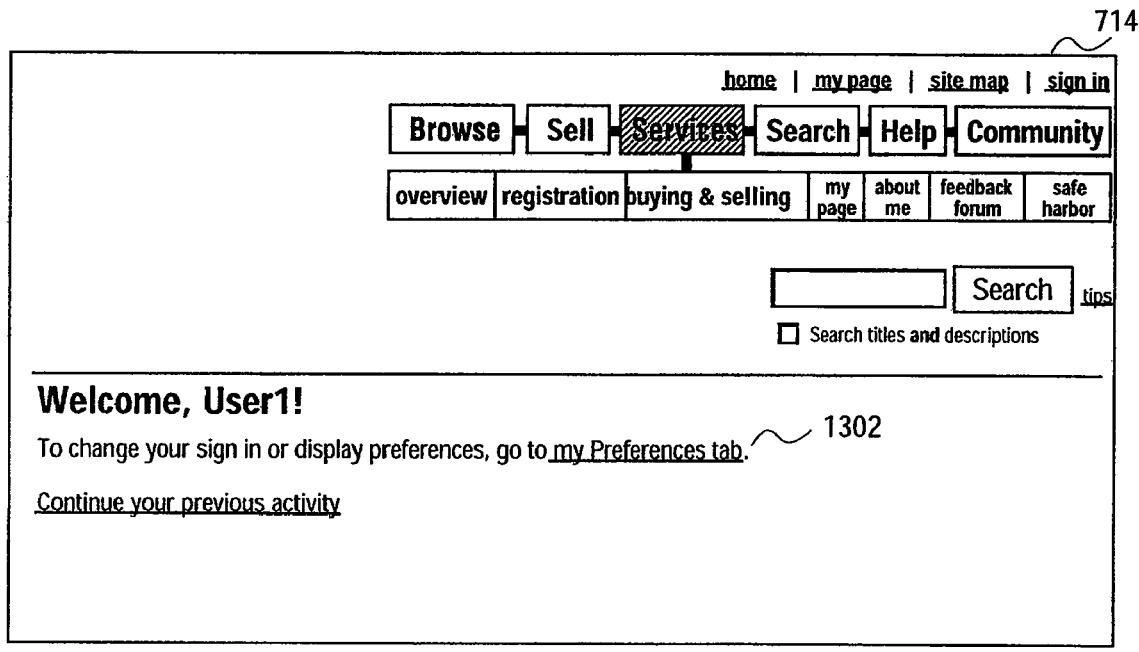

FIG. 12 is an exemplary representation of welcome interface 714 which is displayed if the user has already provided the login preference information in a previous session. Welcome interface 714 includes link 1302 to my preferences interface 716 which allows the user to change the existing login preferences.

FIG. 13 is an exemplary representation of my preferences interface 716. My preferences interface 716 specifies user preferences for various features such as selling, chat, my page, bidding, feedback, and others. The user may change any of the existing preferences via check boxes 1102, 1104, 1106, 1108, 1110 and 1112.

In summary, it will be appreciated that the above described interfaces, and underlying technologies, provide a convenient vehicle for the inputting and modifying of user login preferences pertaining to various features offered by auction facility 10.

Computer Architecture

Figure 16:
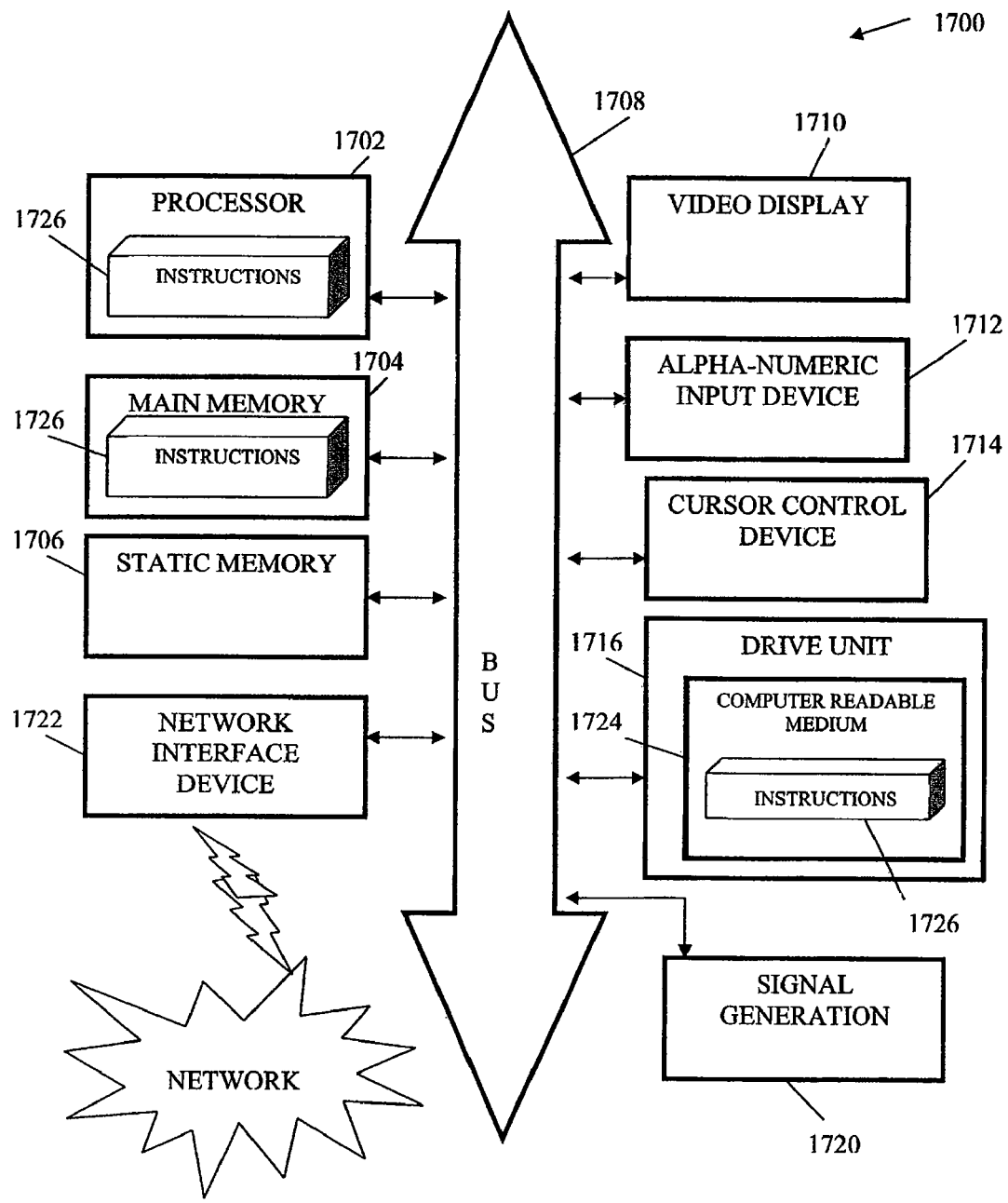
FIG. 16 is a block diagram of one embodiment of a computer system.

FIG. 16 shows a diagrammatic representation of machine in the exemplary form of a computer system 1700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1700 includes a processor 1702, a main memory 1704 and a static memory 1706, which communicate with each other via a bus 1708. The computer system 1700 may further include a video display unit 1710 (e.g., a liquid crystal display (LCD) or a cathode ray tube (CRT)). The computer system 1700 also includes an alpha-numeric input device 1712 (e.g. a keyboard), a cursor control device 1714 (e.g. a mouse), a disk drive unit 1716, a signal generation device 1720 (e.g., a speaker) and a network interface device 1722.

The disk drive unit 1716 includes a computer-readable medium 1724 on which is stored a set of instructions (i.e., software) 1726 embodying any one, or all, of the methodologies described above. The software 1726 is also shown to reside, completely or at least partially, within the main memory 1704 and/or within the processor 1702. The software 1726 may further be transmitted or received via the network interface device 1722. For the purposes of this specification, the term "computer-readable medium" shall be taken to include any medium that is capable of storing or encoding a sequence of instructions for execution by the machine and that cause the machine to perform any one of the methodologies of the present invention. The term "computer-readable medium" shall accordingly be taken to included, but not be limited to, solid-state memories, optical and magnetic disks, and carrier wave signals.

Thus, a method and system for maintaining login preference information of users of a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    setting a session cookie for a user during a login of a user to a network-based transaction facility, the session cookie is set in response to login preference information defined by the user via separate interactions from the login, the session cookie retrieved from a database, and the session cookie identifies the login preference information of the user for access to features of the network-based transaction facility, the session cookie includes a client Internet Protocol (IP) address for the client of the user, a cookie id, and a user id, the session cookie is also encrypted; and
    using the login preference information to selectively activate a number of the features of the network-based transaction facility in a manner that was custom defined by the user within the login preference information.

2. The method of claim 1 further comprising, providing an option within the login preference information that permits the user to exclude the setting of the session cookie for subsequent login sessions of the user to the network-based transaction facility.

3. The method of claim 1 further comprising, removing the session cookie when the user terminates a communication session with the network-based transaction facility.

4. The method of claim 1, wherein using further includes identifying a particular option within the login preference information that instructs the network-based transaction facility to request a password of the user before the user can activate a particular feature of the network-based transaction facility that corresponds to that particular option.

5. The method of claim 1, wherein using further includes identifying a particular option within the login preference information that instructs the network-based transaction facility to automatically recall and supply a password for the user and to permit the user to activate a particular feature of the network-based transaction facility that corresponds to that particular option without the user having to supply the password.

6. The method of claim 1, wherein setting further includes acquiring the login preference information from a database and constructing the session cookie from the acquired login preference information.

7. The method of claim 1 further comprising, ignoring an option within the login preference information that bypasses a password submission made by the user for a particular feature of the network-based transaction facility when the particular feature relates to displaying personal information of the user.

8. A method, comprising:
    interacting with a user to receive login preference information from the user as it relates to a plurality of features available to the user via a network-based transaction facility; and
    providing options for the login preference information that permits the user to decide whether the login preference information is to be set as a session cookie for the user with subsequent login sessions to the network-based transaction facility or whether the login preference information is to be retrieved from a database each time a user attempts to access a particular feature of the network-based transaction facility during those subsequent login sessions, and each option permits the user to custom define how access and presentation of a particular feature is to be handled during those subsequent login sessions, the session cookie when set on a client of the user is encrypted and includes an Internet Protocol (IP) address for the client, a cookie id, and a user id.

9. The method of claim 8 further comprising:
    identifying the user logging into for a particular session with the network-based transaction facility;
    acquiring the login preference information for the user from the database;
    determining from the login preference information that a session cookie is permissible;
    constructing the session cookie to include the login preference information; and
    setting the session cookie for the particular session.

10. The method of claim 9 further comprising:
selectively determining in response to the session cookie whether the user is required to supply a password for a particular feature of the network-based transaction facility; and
overriding a selection that appears to permit the user to bypass supplying the password for the particular feature when the particular features displays personal information associated with the user.

11. The method of claim 9 further comprising, removing the session cookie when the particular session terminates.

12. The method of claim 8, wherein providing further includes permitting the user to custom define different access restrictions for different ones of the features within the network-based transaction facility as it pertains to the user's attempted access of those features during the subsequent login sessions.

13. The method of claim 12, wherein providing further includes identifying at least one access restriction defined by the user that request the user provide verification information for a first-access to a particular feature during a particular one of subsequent login sessions and then permits the user to bypass supplying the verification information during that particular subsequent login session for subsequent accesses to the particular feature.

14. The method of claim 8, wherein providing further includes permitting the user to custom define interfaces and display information presented with those interfaces for a number of the features of the network-based transaction facility.

15. A method, comprising:
logging a user into a network-based transaction facility in response to verification information supplied by the user;
presenting the user with a login preference interface for the user to custom define access restrictions for particular features of the network-based transaction facility on a per feature basis; and
allowing the user to decide within the login preference interface as to whether a session cookie is permissible set during subsequent login sessions of the user with the network-based transaction facility, the login preference information is included within the session cookie, the session cookie also includes a client Internet Protocol (IP) address for a client of the user, a cookie id, and a user id, and the session cookie is encrypted.

16. The method of claim 15 further comprising, allowing the user to custom define presentations that the user can view during the subsequent login sessions on a per feature basis.

17. The method of claim 15 further comprising, ignoring an indication from the user within the login preference interface that attempts to override supplying a user password for particular features that display or access personal information of the user.

18. The method of claim 15, wherein presenting further includes providing options for the features within the login preference interface that are related to bidding, listing items for sale, feedback on transactions with other users of the network-transaction facility, history of transactions, chatting with a number of the other users, and email communications.

19. The method of claim 15 further comprising, identifying certain ones of the features that present credit information of the user or registration information of the user and denying any user attempt to override particular ones of the access restrictions associated with these features.

\* \* \* \* \*

UNITED STATES PATENT AND TRADEMARK OFFICE
CERTIFICATE OF CORRECTION

PATENT NO. : 7,797,548 B2  
APPLICATION NO. : 11/941686  
DATED : September 14, 2010  
INVENTOR(S) : Jennifer Pearson et al.

Page 1 of 1

It is certified that error appears in the above-identified patent and that said Letters Patent is hereby corrected as shown below:

On page 2, under "Other Publications", in column 2, line 50, delete "Presistent" and insert -- Persistent --, therefor.

On Sheet 7 of 16, in Figure 7, Box 702, line 9, delete "not" and insert -- note --, therefor.

On Sheet 7 of 16, in Figure 7, Box 702, line 10, delete "befor" and insert -- before --, therefor.

On Sheet 7 of 16, in Figure 7, Box 702, line 27, delete "assu8mes" and insert -- assumes --, therefor.

On Sheet 13 of 16, in Figure 13, Box 716, line 7, delete "Prefences" and insert -- Preferences --, therefor.

On Sheet 14 of 16, in Figure 14, Box 720, line 9, delete "not" and insert -- note --, therefor.

On Sheet 14 of 16, in Figure 14, Box 720, line 10, delete "befor" and insert -- before --, therefor.

On Sheet 14 of 16, in Figure 14, Box 720, line 27, delete "assu8mes" and insert -- assumes --, therefor.

In column 7, line 44, delete "to included," and insert -- to be included, --, therefor.

Signed and Sealed this

Seventh Day of December, 2010

David J. Kappos  
*Director of the United States Patent and Trademark Office*